United States Patent
Reuschel et al.

(10) Patent No.: US 7,371,204 B2
(45) Date of Patent: May 13, 2008

(54) METHOD AND SYSTEM FOR THE REDUCTION OF THE JERK CAUSED BY RANGE SHIFTING OF A CVT TRANSMISSION WITH POWER DIVISION

(75) Inventors: Michael Reuschel, Ottersweier (DE); Martin Vorhnehm, Bühl (DE); Christian Lauinger, Baden-Baden (DE); Bernhard Walter, Oberkirch (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 100 days.

(21) Appl. No.: 11/085,465

(22) Filed: Mar. 21, 2005

(65) Prior Publication Data
US 2005/0197234 A1 Sep. 8, 2005

Related U.S. Application Data

(63) Continuation of application No. PCT/DE2003/003118, filed on Sep. 19, 2003.

(30) Foreign Application Priority Data
Sep. 21, 2002 (DE) .................. 102 43 902

(51) Int. Cl.
*F16H 61/00* (2006.01)
*F16H 15/38* (2006.01)
*F16H 37/02* (2006.01)

(52) U.S. Cl. ............. 477/45; 477/50; 475/209
(58) Field of Classification Search ......... 477/50, 477/45, 46, 3, 5; 475/208, 209, 210, 78, 475/211, 214, 215, 216, 217
See application file for complete search history.

(56) References Cited

U.S. PATENT DOCUMENTS

| 5,636,119 | A | | 6/1997 | Coutant et al. ............... 701/51 |
|---|---|---|---|---|
| 5,735,770 | A | * | 4/1998 | Omote et al. .................. 477/5 |
| 5,833,570 | A | * | 11/1998 | Tabata et al. .................. 477/3 |
| 5,890,982 | A | * | 4/1999 | Meyerle ...................... 475/72 |
| 5,980,420 | A | * | 11/1999 | Sakamoto et al. ............ 476/10 |
| 6,736,753 | B2 | * | 5/2004 | Endo et al. .................... 477/3 |
| 2002/0086764 | A1 | | 7/2002 | Ooyama ..................... 475/214 |

FOREIGN PATENT DOCUMENTS

| DE | 196 42 503 A1 | 5/1997 |
|---|---|---|
| EP | 0 866 242 A2 | 9/1998 |
| EP | 0 905 413 A1 | 3/1999 |
| EP | 1 146 252 A1 | 10/2001 |

OTHER PUBLICATIONS www.worldingo.com, english translation of DE19642503, Jan. 25, 2007.*

* cited by examiner

*Primary Examiner*—Roger Pang
(74) *Attorney, Agent, or Firm*—Alfred J. Mangels

(57) ABSTRACT

A method and a system for reducing a jerk produced by the range shift of a transmission with a power division arrangement. The transmission includes a variable speed drive in the form of a continuously variable transmission, and a pair of planetary gear sets and a pair of shift clutches to enable power to be divided between two branches within the transmission. During a range shift between two operating ranges the variable speed drive is acted upon by a short-term transmission ratio adjustment impulse in such a way that a cancellation jerk caused thereby the adjustment impulse weakens the jerk caused by the range shift.

5 Claims, 4 Drawing Sheets

METHOD AND SYSTEM FOR THE REDUCTION OF THE JERK CAUSED BY RANGE SHIFTING OF A CVT TRANSMISSION WITH POWER DIVISION

CROSS-REFERENCE TO RELATED APPLICATION

This is a continuation of International Application Serial No. PCT/DE2003/003118, with an international filing date of Sep. 19, 2003, and designating the United States, the entire contents of which is hereby incorporated by reference to the same extent as if fully rewritten.

BACKGROUND OF THE INVENTION

1. Field of the Invention

The invention concerns a method and a system for reducing a jerk produced by the range shift of a CVT transmission with power division.

2. Description of the Related Art

Transmissions with continuously adjustable transmission ratio, especially belt-driven conical pulley transmissions with two conical disk pairs spanned by an endless torque-transmitting means, are increasingly utilized in motor vehicles because of the comfort advantages and fuel economy savings that can be achieved thereby. Because of the limited transmission ratio adjustment, which is made possible by the two conical disk pairs of the transmission ratio adjustment unit, also designated as a variator (variable speed drive), through opposite adjustment of the spacing between the conical disks of the conical disk pairs, the further development of such transmissions is thus intensively investigated so that the adjustment range of the variator can be used twice, in that it is carried out once in the one direction and then in the other direction.

FIG. 1 shows an exemplary CVT transmission with power division:

An engine 2 of a motor vehicle is connected with the input shaft 4 of a variator VAR containing two conical disk pairs spanned by an endless torque-transmitting means. The variator is connected with the output shaft 6 of the transmission by a first planetary gear set P1. A power division path of the transmission leads from the input shaft 4 through a clutch K2 and a second planetary gear set P2 to the output shaft 6.

More precisely, the input side of clutch K2 is non-rotatably connected with the input shaft 4 and the output side with the planet carrier of planetary gear set P1 and the ring gear of planetary gear set P2. The output shaft 6 is non-rotatably connected with the ring gear of the planetary gear set P1 and the planet carrier of planetary gear set P2. The output shaft of the variator is connected with the sun gear of the planetary gear set P1. The sun gear of the planetary gear set P2 is selectively fixed or freely rotatable through a shift clutch K1. To match a motor vehicle, the output shaft 6 is connected with the drive wheels 10 of the motor vehicle through a transmission ratio stage 8, wherein 12 symbolizes the elastic elements contained in the power train of the motor vehicle, which make the power train susceptible to vibration.

The variator VAR, and the shift clutches K1 and K2 are controlled by a control unit 14 with a microprocessor 16, a program memory 18, and a data memory 20. The control unit 14 has inputs 22, which are connected with sensors of the power train, for example rotational speed sensors, load sensors, temperature sensors, an accelerator pedal position sensor, a transmission selector lever position sensor, etc. The control unit 14 generates output signals at its outputs 24, in accordance with which the actuators of the variator VAR, and the shift clutches K1 and K2 are operated.

The construction and function of the described system are known and are therefore not described in detail.

FIG. 2 shows the overall transmission ratio $i_{GES}$ of the transmission as a function of the transmission ratio $i_{VAR}$ of the variator VAR, and the positions of the shift clutches K1 and K2.

In the first range of the transmission, while driving at high transmission ratios or at low speed, the shift clutch K2 is disengaged, and the shift clutch K1 engaged, so that the sun gear of the planetary gear set P2 is stationary, and the ring gear of the planetary gear set P2 rotates together with the planet carrier of the planetary gear set P1. The transmission runs in the non-power-division range, while its transmission ratio changes corresponding to the transmission ratio of the variator $i_{VAR}$. When the variator reaches its longest possible transmission ratio ($i_{VAR}$ approximately=0.5), a shift occurs in the overall transmission ratio U, in which the shift clutch K1 is disengaged and the shift clutch K2 is engaged, so that a power-division operation takes place, which is carried out at higher speeds, and which leads to the longest possible overall transmission ratio $i_{GES}$ of the transmission of approximately 0.8. As shown, in that way by a spread of about 4 for the variator, a spread of about 7 for the overall transmission ratio can be achieved.

A problem that is encountered during a range shift of the transmission consists in the fact that rotating masses within the transmission, especially when shifting during rotational speed gradients take place, for example kick-down downshifts, require high acceleration output. That acceleration output is lost in the traction force, and thereby causes a shift jerk, or a shift jerking, which is detectable in the motor vehicle, and is relatively uncomfortable.

The invention is based on the object to avoid such jerks in a range shift.

SUMMARY OF THE INVENTION

A first solution of the object of the invention is achieved with a method for the reduction of a jerk produced by the range shift of a CVT transmission with power division, in which the variator is acted upon in such a way by a short-term transmission ratio adjustment impulse that a cancellation jerk caused thereby weakens the jerk caused by the range shift.

Advantageously, the cancellation jerk is produced directly after a range shift. The controlled change of the clutch torque can then in substantial part be concluded.

Advantageously, the duration of the cancellation jerk corresponds to approximately a quarter of a jerking period.

In a preferred embodiment of the method, the magnitude of the cancellation jerk corresponds approximately with the magnitude of the jerk caused by the range shift.

A further solution of the object of the invention is achieved with a method for the reduction of a jerk produced by the range shift of a CVT transmission with power division, in which the actuation of the shift clutches that bring about the range shift which stimulates a jerk is modified corresponding with the rotary mass accelerations resulting from the range shift.

Preferably, the engaging shift clutch is engaged prematurely.

In a further advantageous embodiment the contact pressure of the engaged shift clutch is increased.

For the described method, in an advantageously employable method for controlling the operation of a shift clutch effected as brake in a CVT transmission with power division, the input and output rotational speed of the variator, as well as the rotational speed in the power-division transmission range are measured, from which the slippage rotational speed of the shift clutch is determined and supplied to a slip regulator.

A system for reducing a jerk caused by range shift of a CVT transmission with power division, for solving the object of the invention, contains a transmission with a variator, two planetary gear sets, and two shift clutches, by means of which the flow of torque of the transmission can be switched in different ways from an input shaft drivable by an engine to an output shaft driving a motor vehicle, actuators for operating the variator and the shift clutches, and a control unit for controlling the actuators as a function of the operating parameters of the motor vehicle and a driver's desire, whereby the control unit controls the actuators corresponding with a method in accordance with one or several of the above-stated method claims.

BRIEF DESCRIPTION OF THE DRAWINGS

The invention will be explained below on the basis of exemplary schematic drawings and with further details in which drawings.

DESCRIPTION OF THE PREFERRED EMBODIMENTS

Figure 1:
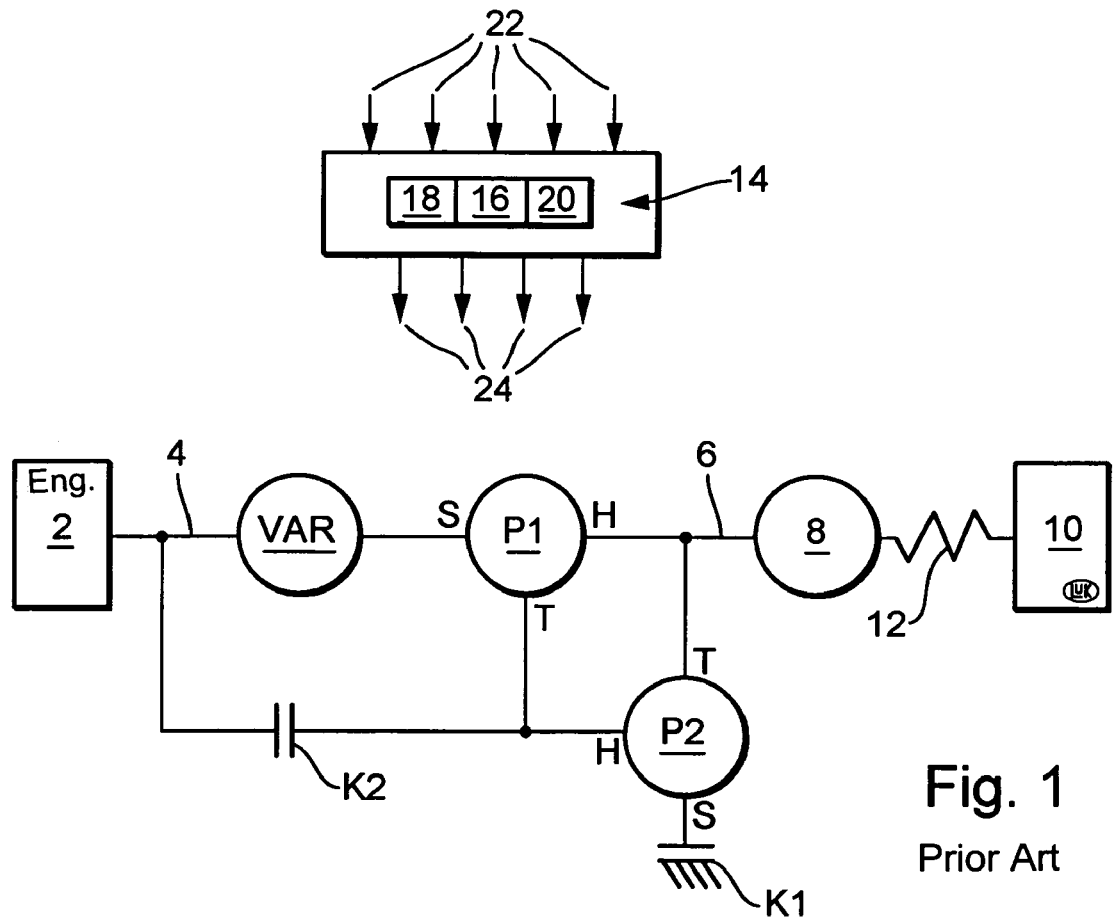
FIG. 1 shows a basic connection diagram of a known transmission with power division.

As can be seen from FIG. 1, in the first region (FIG. 2), or the non-power-division region, the sun gear of the planetary gear set P2 is stationary, because the clutch K1 is engaged. In the power division operation, however, the ring gear of the planetary gear set P2, and the planet carrier of the planetary gear set P1 rotate at the rotational speed of the input shaft 4 (clutch K2 engaged), and the sun gear of the planetary gear set P2 is freely rotatable, whereby its rotation is determined by the rotation of the output shaft 6 and the input shaft 4 or its planet carrier and the ring gear. When shifting, internal transmission rotary masses must then be accelerated and/or decelerated, which can lead to a jerk in the longitudinal direction of the motor vehicle.

Generally speaking, there exist in power-division transmissions internal transmission rotary masses whose rotational speed behavior is neither synchronous to the input rotational speed nor synchronous to the output rotational speed. The rotational acceleration of those rotary masses changes abruptly at a range change, so that the output power also undergoes a jump.

Known solutions for the reduction of jerks caused by such rotational speed jumps are based on the engagement of the engine or the smoothing of clutch actuations. Other solutions suggest special variator regulators, which recognize an existing jerk and which regulate the variator to modulate in a damping effective way.

In accordance with the invention it is proposed to cancel a jerk excitation by an opposite excitation. Necessary for that purpose is derivable knowledge of the magnitude and the instant of excitation of the particular transmission.

For employing the essential change of the variator VAR in a range shift concerns the variator torque, which changes the magnitude and the sign. As a consequence thereof, the contact pressure requirement and the support change, that is, the required contact pressure between the conical disk pairs, and the endless torque-transmitting means to maintain the transmission ratio change. The changes resulting from a range shift are basically known and can therefore be predicted by control technology, so that a range shift is not connected with a sudden drift of the transmission ratio.

In accordance with the invention, through the subsequent control or subsequent adjustment of the contact pressure required beyond the support function, a short-term adjustment of the variator to produce a cancellation jerk takes place.

One such cancellation jerk can, in theory, be produced before or after or also during the range shift. In both cases, the principle of cancellation is operative. Overall, many application cases have shown that it is preferable when the cancellation jerk is produced after the range shifts.

The cancellation jerk is produced in that an adjustment force impulse for adjusting the variator is produced, which has a defined magnitude and duration. The duration advantageously lies within the range of a quarter of a jerk period, especially within the range of 50 milliseconds to 200 milliseconds, as is often the case. The magnitude of the actively induced cancellation jerk is proportional to the strength of the excitation to be canceled. For the magnitude of the cancellation jerk, in numerous transmissions, especially transmissions with the structure in accordance with FIG. 1, the driving rotational speed gradient serves as a useful measure. Other suitable signals are the transmission ratio gradient or the acceleration jump of the internal transmission rotary masses which is to be expected at a range change. Furthermore, suitable values for determining the magnitude of the cancellation jerk to be applied are the so-called target signals (for example, target transmission ratio, or target rotational speed gradient). Those target signals depend generally less sensitively on measured signals, and are therefore more feedback-free (feedback is potentially unstable). Typical values for the magnitude of a cancellation jerk are between 10 kN and 50 kN. The proportionality constant, which designates the relationship between the magnitude of the cancellation jerk and the strength of the excitation to be canceled can be determined, for example, experimentally.

Figure 3:
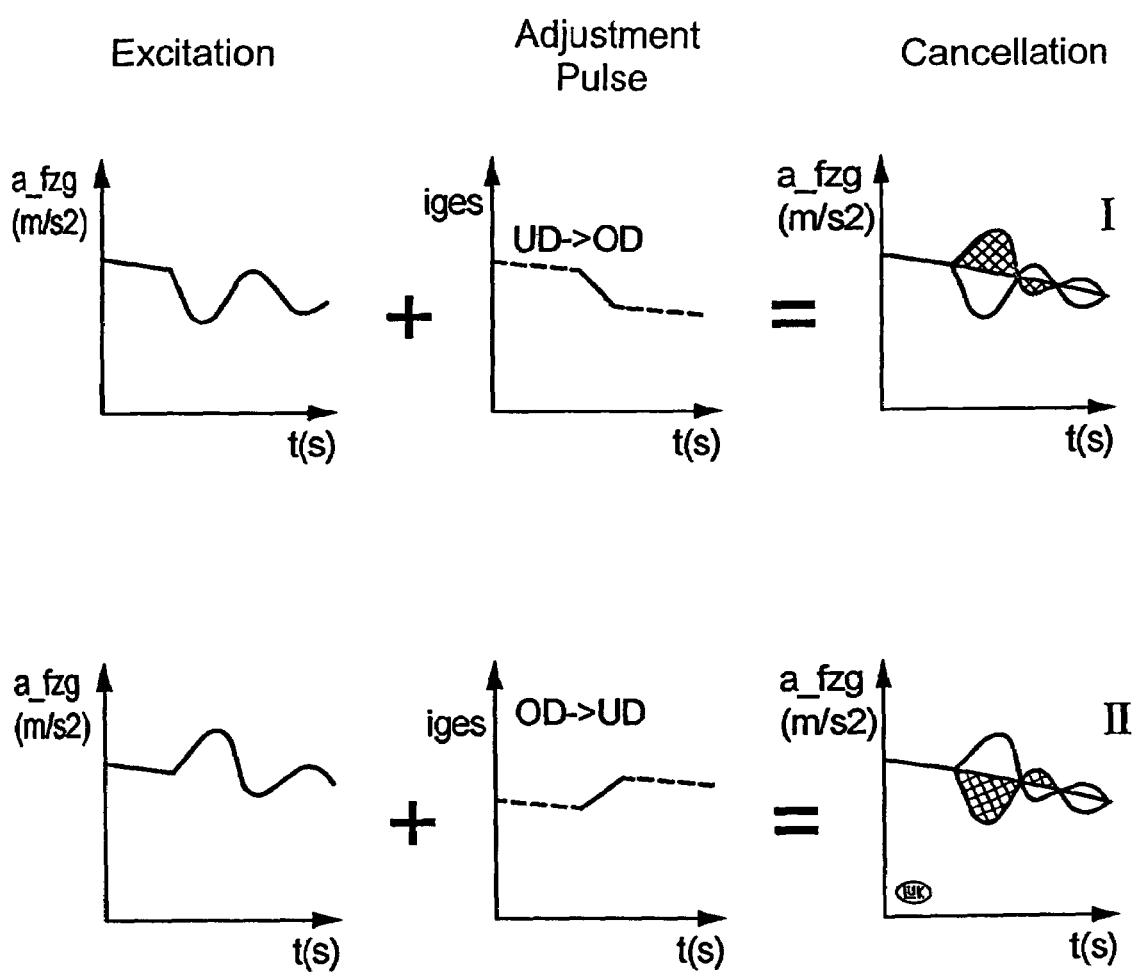
FIG. 3 shows graphs for explaining a method in accordance with the invention.

FIG. 3 explains the method in accordance with the invention by way of two examples.

Both figures on the left show the existing motor vehicle acceleration $a_{FZG}$ in m/s² as a function of the time t in seconds, without use of the cancellation jerk in accordance with the invention. The middle graphs show the transmission ratio adjustment impulse for adjusting the overall transmission ratio $i_{GES}$. That adjustment impulse leads to a cancellation jerk, which in both graphs on the right is shown crosshatched.

The three upper graphs (I) show the conditions for a motor vehicle that experiences a delayed jerk at a range shift (initiation of the excitation vibration is a reduction in the acceleration). That excitation jerking is superimposed with an adjustment impulse in accordance with the upper middle graph, in which the transmission ratio is changed in the direction of UD (underdrive) to OD (overdrive), whereby a cancellation jerk (upper right in FIG. 3) is produced, which is opposite to the excitation jerk, so that the excitation jerking and the cancellation jerking produced by the adjustment impulse cancel each other, whereby the range shift takes place largely jerk-free.

The three lower drawings (II) of FIG. 3 show the conditions for the case when the motor vehicle is first accelerated in a range shift without a specific adjusting impulse for the variator adjustment. Here, the adjusting impulse takes place in the direction of an adjustment of the transmission ratio from OD to UD.

Overall, in accordance with the invention, with a specific introduction of an adjusting impulse in the variator, the jerk in range shift can largely be avoided.

Figure 4:
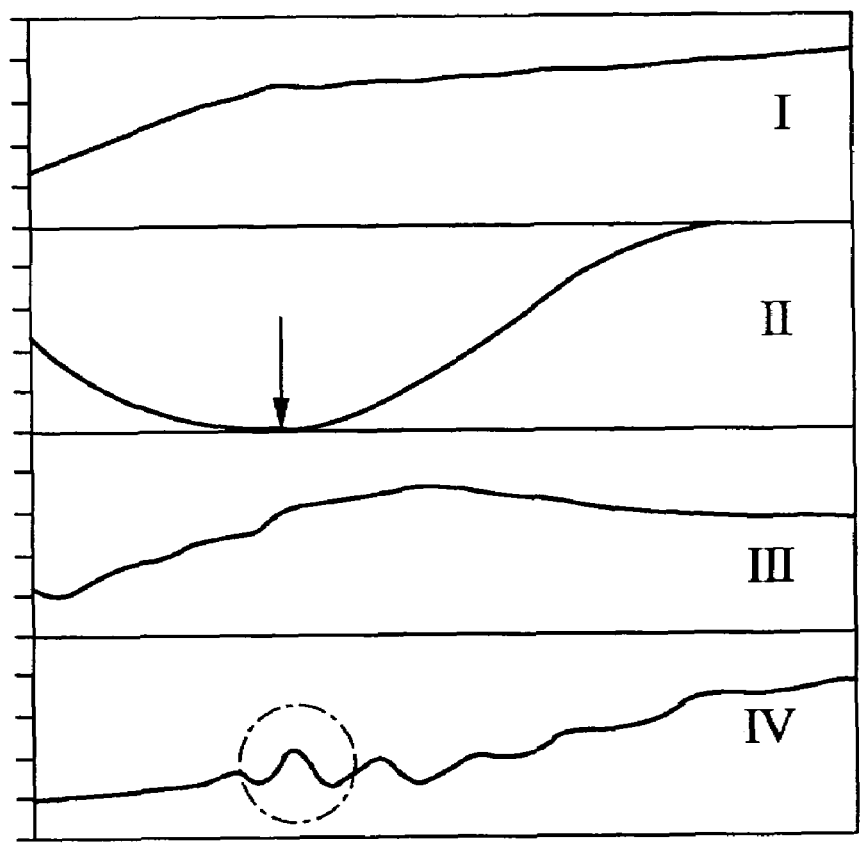
FIGS. 4 and 5 show graphs to explain the effectiveness of the method in accordance with the invention.
Figure 5:
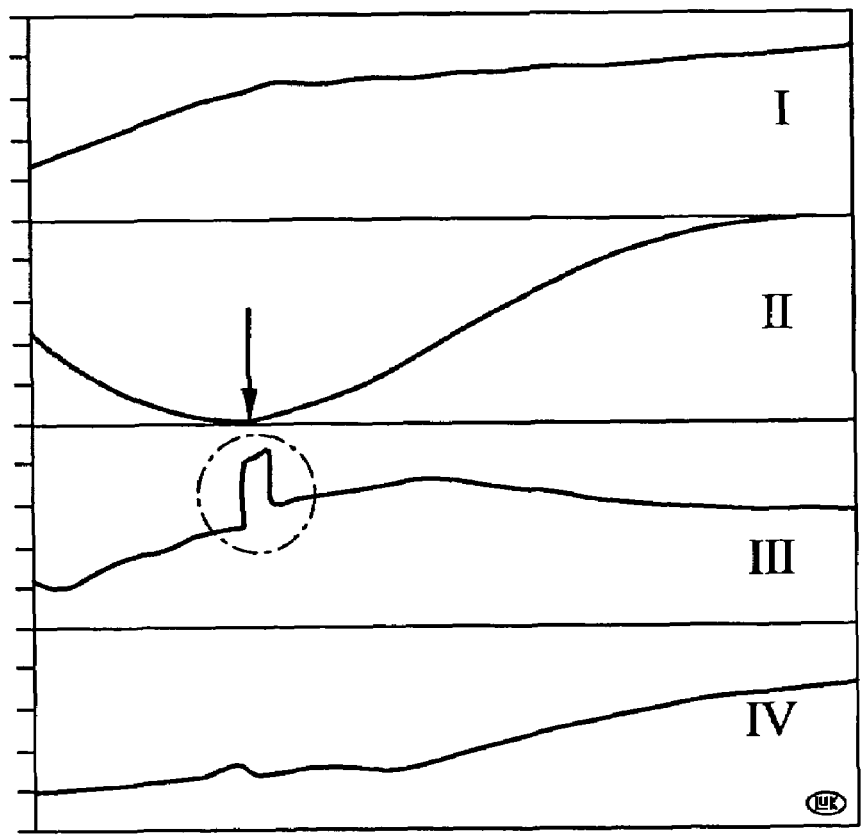

With the help of FIGS. 4 and 5 a special example for the effectiveness of the method in accordance with the invention is explained. In FIG. 4 time is shown in the abscissa in each case. The uppermost curve I shows the rotational speed of the output-side disk set of the variator, curve II shows the transmission ratio of the variator, whereby the range shift takes place at the minimum transmission ratio (see the arrow). Curve III shows the adjustment force of the variator, and curve IV shows the motor vehicle acceleration.

As can be seen (curve IV) the vehicle jerks severely at the range shift.

FIG. 5 shows the same conditions as FIG. 4, with the difference, however, that the adjustment force is raised higher at, or immediately after the range shift. That leads to a slight S-shaped path as can be seen from curve II, which in turn excites a cancellation impulse, shown in curve III, so that in accordance with FIG. 4, the motor vehicle acceleration during the range shift takes place essentially jerk-free, as shown in curve IV.

As explained, it is thereby possible to largely or completely suppress a shift jerk that occurs during the range shift by means of an adjustment impulse to the variator when shifting, which leads to a cancellation impulse opposite to the shift impulse. The direction and magnitude of an effective adjustment impulse on the variator transmission ratio the in direction of an adjustment, are a function of the transmission construction and the shift direction.

Figure 6:
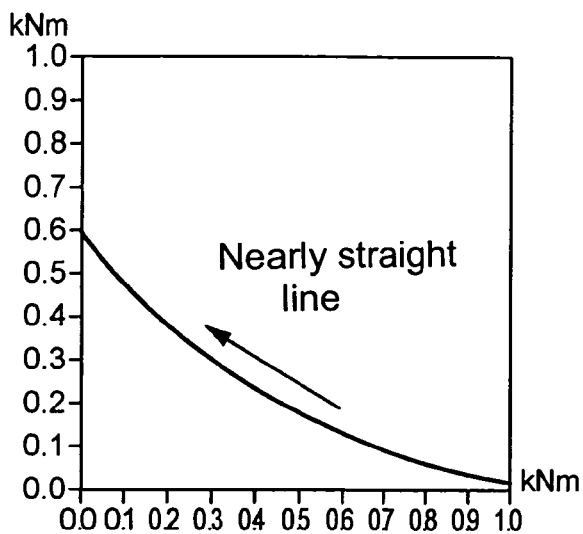
FIGS. 6 to 8 show graphs to explain a further method in accordance with the invention.
Figure 6:
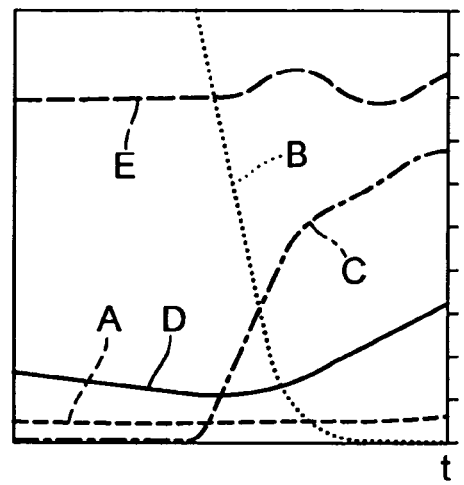
Figure 7:
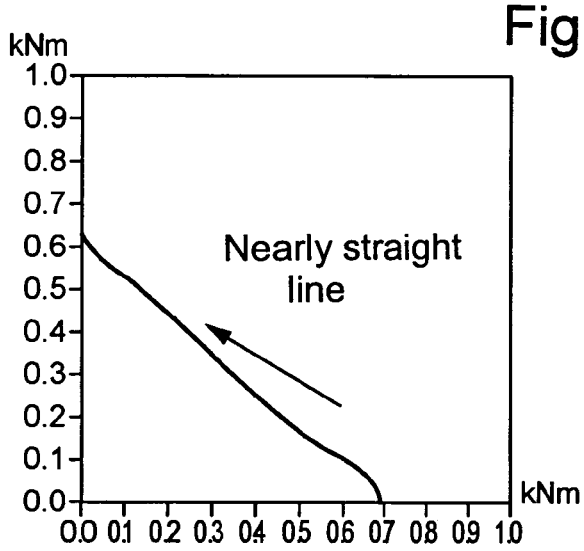
Figure 7:
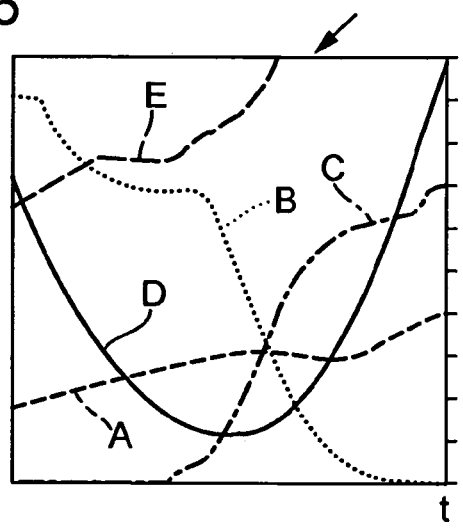
Figure 8:
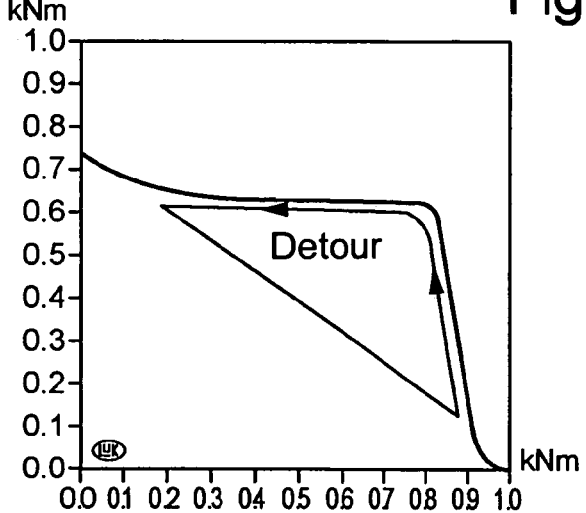
Figure 8:
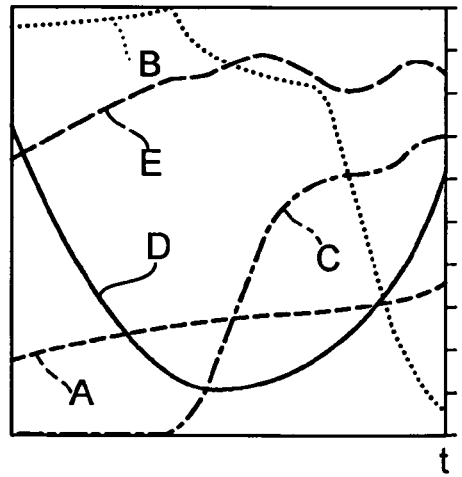

A further possibility to eliminate or to avoid the shift jerk, consists in a modification of the operation of the shift clutches K1 and K2 (FIG. 1), which is explained on the basis of FIGS. 6 to 8.

In the left part of FIG. 6 there is illustrated to what degree in which the shift clutch (abscissa) to be disengaged is disengaged, the takeover clutch to be engaged is being engaged (ordinate). In each case, the transmittable frictional torque of the shift clutches is shown in kNm. In accordance with the left part of FIG. 6, an approximate straight line equation applies for both clutch torques.

In the right part of FIG. 6, the abscissa represents in each case the time t corresponding with the shift of only one engaged shift clutch, to only the other engaged shift clutch. Curve A denotes the engine rotational speed, curve B denotes the transmittable torque of the disengaging shift clutch, curve C denotes the transmittable torque of the engaging clutch, curve D shows the variator transmission ratio (shift at the minimum), and curve E denotes the motor vehicle acceleration. As can be seen, in the illustrated case, the shift takes place without substantial change of the engine rotational speed with a slight motor vehicle jerking after the shift.

FIG. 7 corresponds with FIG. 6; the course of the clutch torques again approximates a straight line. In the case of FIG. 7, the range shift of the transmission, however, takes place during a rotational speed gradient of the engine. In accordance with the rotational speed gradient, the range change is combined with a large excess acceleration, which leads to a strong jerk of the motor vehicle (arrow at the not completely shown curve E) with subsequent jerking.

FIG. 8 shows the conditions of FIG. 7, however with a "detour-overlapping" in accordance with the invention. As can be seen from the left part of FIG. 8 and the curves B and C, the takeover clutch is already engaged in the shift in accordance with FIG. 8, while the disengaging clutch still transmits high torques. That condition is associated with a tension, which reaches a predetermined quantity, and absorbs the excess acceleration. For the two clutch torques no straight line equation applies, but their course shows a distinct "detour." That detour means the simultaneously engaged condition of both clutches. The resulting motor vehicle acceleration (curve E of FIG. 8) does not have a distinct overshoot anymore, as compared to curve E in FIG. 7. As a result, in spite of the rotational speed gradients (curve A) the range change in comparison with FIG. 7 is distinctly more comfortable.

It is apparent that the methods in accordance with FIG. 3, and FIG. 5, as well as FIG. 8, can be applied in power-division transmissions of the most varied structural types, whereby the adjustment pulse (FIG. 3) and the detour (FIG. 8) are each appropriately selected. Likewise, it can also be advantageous to form the detour still more curved. Thereby, in the middle of the range change, for example, a tension gap can be produced, which is advantageous for canceling opposite jerks.

A further problem that appears in the control of the range shift of a power-division CVT transmission is the following:

For controlling or regulating such a power-division transmission, in general only two rotational speed sensors are required for the rotational speed of both conical disk pairs. Insofar as the transmission condition is determined by shift clutches in each case (one clutch slip-free; shift clutches $K_1$, and $K_2$ of FIG. 1), the required functions of the transmission ratio control or regulation of the variator can be produced from the rotational speeds of the disk sets, the operation of the shift clutches, also from the rotational speeds of the disk sets and the starting control from the rotational speed of the input-side disk sets, and the engine rotational speed.

Figure 2:
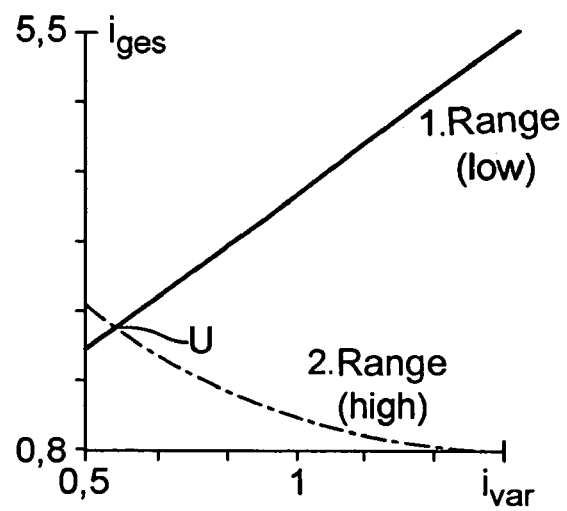
FIG. 2 shows the transmission ratio of the transmission in accordance with FIG. 1, as a function of the transmission ratio of the variator.

For optimizing the costs and structural space it is advantageous from the start to eliminate a starting clutch, not shown in FIG. 1, and to produce starting through the low-range clutch (clutch K1 in FIG. 2). For further optimizing costs and structural space it is advantageous, instead of a complete two-mass-flywheel (then the mass of the input-side disk set operates as a secondary mass of the two-mass-flywheel), or the complete two-mass-flywheel, to save and to install a slip regulation for noise reduction. For a slip regulation, in each case a most exact possible slip signal of the controlled clutch is required.

In the transmission in accordance with FIG. 1, the slip of shift clutch K1, which represents a brake for the sun gear, is identical with the rotational speed of the shaft of the sun gear braked by the clutch. When reducing the slip, or engaging the clutch, that rotational speed becomes very low, which makes its detection with a sensor more difficult. Common speed sensors are based on the evaluation of the impulse of a trigger-wheel. At a low rotational speed only a few impulses are produced in long intervals. That makes a regulation impossible when expensive trigger-wheels with a fine gradation are not installed.

In accordance with the invention, it is accordingly proposed to supplement the rotational speed of the input shaft 4 of VAR and the rotational speed of the output shaft of VAR, to also detect the rotational speed in the divided transmission branch (rotational speed of the output shaft of shift clutch K2) or of the planet carrier of the planetary gear set P1, as well as the rotational speed of the ring gear of the planetary gear set P2 with a sensor is suggested. That rotational speed continuously lies in a precisely measurable range between, for example, 1,000 and 6,000 RPM. From the three measured rotational speeds, the rotational speed of the braked shaft of the shift clutch K1 or the slip rotational speed can be calculated exactly, on the basis of the existing transmission ratios, and supplied to a slip regulator contained in control unit 14.

For the illustrated transmission configuration the following applies:

$$n_{S2} = n_V * (i_1 + i_2 - 1)/i1 - n_{SS2} * (1 - i_2)/i_1$$

whereby $n_{S2}$ is the rotational speed of the sun gear of planetary gear set P2, $n_V$ the rotational speed of the ring gear of planetary gear set P2, $i_2$ the transmission ratio of planetary gear set P2, and $n_{SS2}$ the rotational speed of the output-side disk set of the variator VAR.

In the case of $i_1 = -2.5$ and $i_2 = -1.5$, it results in the simple formula:

$$n_{S2} = 2 * n_V - n_{SS2}$$

As is apparent from the foregoing, the accuracy of the determined rotational speed of the sun gear of planetary gear set P2 corresponds to the accuracy of the other rotational speeds.

A similar formula can be derived, in order to calculate the rotational speed $n_{S2}$ from the output rotational speed of the transmission and the rotational speed of the output-side disk set of the variator.

The methods described above can be applied individually or together in any desired combination.

The invention claimed is:

1. A method for the reduction of a jerk generated by a transmission ratio range shift of a transmission having power-division provided by two transmission ratio ranges, said method comprising the steps of: initiating a range shift from a first transmission ratio range to a second transmission ratio range; and applying a specific short-term transmission ratio adjustment impulse for adjusting the transmission ratio in an adjustment magnitude to provide a cancellation jerk of a magnitude and duration to diminish a jerk caused by the transmission range shift.

2. A method in accordance with claim 1, wherein the cancellation jerk is produced immediately after the range shift.

3. A method in accordance with claim 1, wherein the duration of the cancellation jerk corresponds to about a quarter of a jerk period.

4. A method in accordance with claim 1, wherein the cancellation jerk has a magnitude that corresponds substantially to a jerk magnitude caused by the range shift.

5. A method in accordance with claim 1 wherein the transmission is a continuously variable transmission.

* * * * *